United States Patent Office 3,221,041
Patented Nov. 30, 1965

3,221,041
p-(1,2-DICYANOVINYL)N,N-DIMETHYLANILINE COMPOUNDS
John R. Roland, Wilmington, Del., assignor to E. I. du Pont de Nemours and Company, Wilmington, Del., a corporation of Delaware
No Drawing. Filed Dec. 18, 1962, Ser. No. 245,415
5 Claims. (Cl. 260—465)

This invention is concerned with a new class of colored organic chemical compounds which are useful as dyes and with a process for their preparation.

The 1,2-dicyano-2-sulfonylvinyl dyes are the subject of the copending application of Martin, Ser. No. 200,314, filed June 6, 1962. These dyes include both cis and trans compounds of the formula:

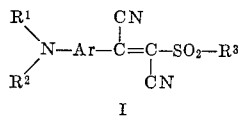

I in which the R's and Ar are as defined below.

In an attempt to prepare colorless dihydro or "leuco" forms from the dyes of Formula I by subjecting them to catalytic hydrogenation, it was discovered that the dihydro compounds of Formula II:

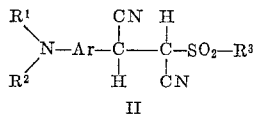

II which might be expected from saturation of the vinyl group, are not obtained. Instead, it was discovered that catalytic hydrogenation of the compounds of Formula I surprisingly results in hydrogenolysis, with removal of the sulfonyl group, to yield the 1,2-dicyanovinyl-substituted aromatic amine dyes of Formula III. This reaction can be represented by the equation:

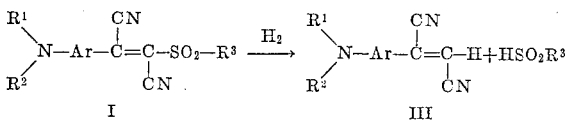

in which $R^1$, $R^2$, and $R^3$ can be alkyl or haloalkyl of 18 carbon atoms or less, β-hydroxyethyl, β-alkoxyethyl, β-acyloxyethyl, β-cyanoethyl, β-trialkylammoniummethyl halide—also referred to as trialkylethyleneammonium halide, i.e., $$\left[ \begin{array}{c} \diagup (alkyl)_3 \\ N \\ \diagdown CH_2\!-\!CH_2\!- \end{array} \right]^{\oplus} [halide]^{\ominus}$$

aryl (i.e., phenyl, naphthyl, etc.), 4-hydroxyaryl, 4-alkoxyaryl, 4-acyloxyaryl, 4-cyanoaryl, or 4-haloaryl, with the proviso that $R^1$ and $R^2$ can also be hydrogen, and Ar is arylene, preferably 1,4-arylene (i.e., 1,4-phenylene, 1,4-naphthylene, 1,4-anthrylene, 9,10-anthrylene, etc.).

The new compounds of Formula III are not only colored and useful as dyes, but unexpectedly the colors are brighter than the precursors of Formula I. Moreover, the dyes are characterized by a resistance to decomposition under practical dye bath conditions. This property is not possessed by (1) the precursors of Formula I, (2) the related dyes of Heckert U.S. Patent 2,803,640 indicated by Formula IV:

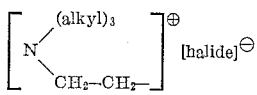

IV wherein X is hydrocarbyloxycarbonyl, carbamyl, or hydrocarbylcarbonyl, (3) the related dyes of Heckert U.S. Patent 2,889,335 indicated by Formula V;

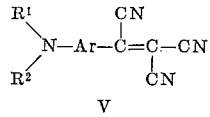

V and (4) the isomeric dye of Walter, Ber. 35, 1320 (1902) and Sachs and Lewin, Ber. 35, 3577 (1902) indicated by Formula VI:

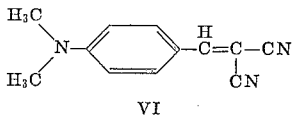

VI

The differences in dyebath stability between the dyes of this invention (Formula III) and the compounds of Formulas I, IV, V, and VI are all of the sort illustrated in Example III.

The hydrogenolysis process of this invention is carried out by bringing a 1,2-dicyano-2-sulfonyl vinyl dye of Formula I into intimate contact with gaseous hydrogen in the presence of a hydrogenation catalyst. This is suitably carried out in the presence of an organic liquid medium which is inert to the reactants and products. Suitable media include such compounds as methanol, ethanol, n- or iso-propanol, the butyl alcohols, especially n-butyl alcohol and acetic acid. It is preferred to employ at least a slight molecular excess of hydrogen.

Pressure and temperature are not critical factors in the process of this invention. However, pressures in the range from atmospheric pressure up to 1,000 atmospheres pressure are preferred, and temperatures in the range from 0° to 200° C. are preferred.

The hydrogenation catalyst is a metal of Group VIII of the Periodic Table and, more particularly, a noble metal of Group VIII. Palladium is especially preferred. The metal may be unextended or extended on an inert support such as carbon, alumina, or silica and the metal may be in elemental form or in the form of one of its oxides. The catalyst may be employed in the range of from 0.01% to 10% by weight of the compound of Formula I.

The time of contact between the reactants in the hydrogenolysis process is not critical, and the process may be operated batchwise or on a continuous basis. Contact times in either method are preferably in the range from one-half minute to ten hours, depending on the temperature and pressure.

The alkyl groups in alkyl, haloalkyl, alkoxyethyl, trialkylammonium and alkoxyaryl are aliphatically saturated and contain 18 carbon atoms or less. Lower alkyl groups are preferred.

The acyl groups in acyloxyethyl and acyloxyaryl contain 18 carbon atoms or less and include aliphatic carbacyl such as formyl, acetyl, propionyl, octanoyl, and octadecanoyl, and aryl or haloaryl carbacyl such as benzoyl, naphthoyl, and anthroyl.

Halogen in haloaryl and haloalkyl includes fluorine, chlorine, bromine, and iodine.

Aryl in aryl, hydroxyaryl, alkoxyaryl, acyloxyaryl, cyanoaryl, and haloaryl includes phenyl, naphthyl, and anthryl and lower alkyl-substituted derivatives of these containing 18 carbon atoms or less.

Alkyl in trialkylammonium includes lower alkyl, particularly methyl and ethyl.

The compounds of Formula I, which are the starting materials for the process of this invention, are prepared by reaction of a 1,2-dihalo-1,2-dicyanoethylene, an organosulfinate salt, and an aromatic amine as illustrated by the equation:

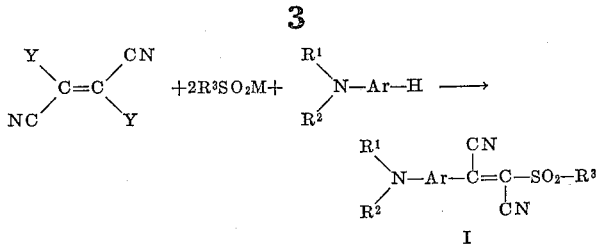

in which Y is halogen, particularly chlorine or bromine, M is one equivalent of a salt-forming cation, particularly an alkali metal cation or an alkaline earth metal cation such as Li, Na, K, Mg, Ca, and Ba, and the R's and Ar are as defined above.

The preparation of 1,2-dicyano-2-sulfonyl vinyl compounds of Formula I according to the above equation may be carried out over a wide range of temperatures. Temperatures ranging from about −100° C. up to the decomposition temperature of the reactants and/or products are operable. Temperatures in the range from −40° C. to 150° C. are generally suitable and temperatures in the range of 0 to 50° C. are particularly preferred.

Pressure is not a critical factor in this preparation. Pressure both below and above atmospheric pressure may be employed. Atmospheric pressure is preferred for convenience.

The use of a reaction medium is optional since the formation of the 1,2-dicyano-2-sulfonyl vinyl dyes of Formula I can be readily accomplished in the solid state by impact grinding together the reactants indicated above. The use of a liquid reaction medium which is chemically inert to the reactants and products permits control of the temperature of the reaction and, therefore, is preferred. There may be employed such liquids as dimethylformamide, tetrahydrofuran, acetone, methanol, ethanol, methylene chloride, and the like. This preparation is illustrated in Part A of Example I.

In the examples which follow, parts are by weight unless otherwise indicated. Example I illustrates a preferred embodiment.

EXAMPLE I

Part A

A solution of 111 parts of dichlorofumaronitrile in 472 parts of dimethylformamide is stirred at room temperature while adding 121 parts of N,N-dimethylaniline in one portion, followed by portion-wise addition of 168 parts of sodium p-toluenesulfinate over a 20-minute period. The reaction mixture is stirred at room temperature for an additional 20 minutes and then drowned in an ice/water mixture. After the ice melts, the water is decanted and the crude dye is recrystallized from methylene chloride to obtain 108 parts of 2-(4-N,N-dimethylaminophenyl) - 1 - (4 - tolylsulfonyl)ethene - 1,2-dicarbonitrile melting at 153–155° C. and having an extinction coefficient at 515 mμ of 37,700 (CH$_2$Cl$_2$ solvent).

Part B

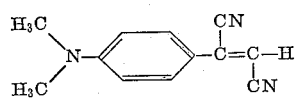

Twenty parts of 2-(4-N,N-dimethylaminophenyl)-1-(4-tolylsulfonyl)ethene-1,2-dicarbonitrile is dissolved in 1579 parts of absolute ethanol. Five parts of 5% palladium-on-carbon catalyst is added, and the mixture is shaken under hydrogen pressure of 30–40 lbs./sq. in. gauge. After cessation of hydrogen absorption, the catalyst is filtered from the reaction mixture and the filtrate concentrated to crystallize the dye. Recrystallization from alcohol gives 10 parts of p-(1,2-dicyanovinyl)-N,N-dimethylaniline, which melts at 113.5–114° C. and has an extinction coefficient at 423 mμ (EtOH) of 23,200.

*Analysis.*—Calcd. for C$_{12}$H$_{11}$N$_3$: C, 73.1; H, 5.6; N, 21.3. Found: C, 72.9; H, 5.6; N, 20.9, 21.1.

Part C

One part of p-(1,2-dicyanovinyl)-N,N-dimethylaniline is dissolved in about 50 parts of acetone and poured into 10,000 parts of water containing one part of a nonionic wetting agent of the polyethylene oxide type. A multifabric swatch is immersed in the dispersed dye bath and the whole heated at 90–100° C. for one hour. The fabric is removed, washed with soap, and thoroughly rinsed and dried. Under these conditions cellulose acetate, polyethylene terephthalate, 66 nylon, polyacrylonitrile, silk, and wool fabrics are dyed shades of yellow ranging from light lemon-yellow for polyacrylonitrile to a deep, brilliant, almost fluorescent yellow for silk.

EXAMPLE II

Part A

N-benzoxyethyl-N-methylaniline is substituted for N,N-dimethylaniline in the procedure of Part A of Example I to obtain 2-(4-N-benzoxyethyl-N-methylaminophenyl) - 1 - (4-tolylsulfonyl)ethene - 1,2 - dicarbonitrile. This dye has an extinction coefficient of 38,600 in CH$_2$Cl$_2$ at 500 mμ.

Part B

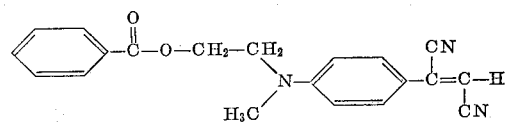

A solution of 17 parts of 2-(4-N-benzoxyethyl-N-methylaminophenyl)-1-(4-tolylsulfonyl)ethene - 1,2 - dicarbonitrile is dissolved in 1579 parts of absolute ethanol. Five parts of 5% palladium-on-carbon catalyst is added and the mixture is shaken under hydrogen pressure of 40 lbs./sq. in. gauge for two hours. The catalyst is filtered off and the filtrate concentrated to crystallize the dye. Recrystallization from alcohol gives p-(1,2-dicyanovinyl)-N-benzoxyethyl-N-methylaniline having an extinction coefficient (EtOH) of 30,300 at 415 mμ.

EXAMPLE III

The superior dyebath stability of the compounds of this invention is illustrated as follows. Six dyebaths are prepared, each containing 2000 parts of water, 4 parts of dimethylterephthalate, and 4 parts of benzanilide. To each of baths 1 and 2 is added 0.125 part of 4-(1,2-dicyanovinyl)-N,N-dimethylaniline (product of Example I). To each of baths 3 and 4 is added 0.125 part of N-benzoxyethyl - 4 - (1,2-dicyanovinyl) - N-methylaniline (product of Example II.) To each of baths 5 and 6 is added 0.125 part of 4-(2,2-dicyanovinyl)-N,N-dimethylaniline (Sachs and Lewin, Ber. 35, 3577 [1902]). Baths 2, 4, and 6 are first heated at reflux for two hours. At the end of this time baths 1, 3, and 5 are also brought to reflux temperature and to each of the six baths is added 50 parts of polyethylene terephthalate yarn. Dyeing in all six baths is continued at reflux temperature for one hour, at the end of which time the yarns are removed, rinsed thoroughly in water and dried. The yarns from baths 1 and 2 are both dyed a brilliant fluorescent greenish yellow shade. The depth of color of the yarn from bath 2 is at least as strong as that from bath 1, indicating that no hydrolysis of the dye occurred during the two hours heating at reflux. The yarns from baths 3 and 4 are both dyed a bright yellow shade. The depth of color of the two yarns is substantially identical, indicating that substantially no hydrolysis of the dye occurred during the two hours heating at reflux. The yarn from bath 5 is dyed yellow and the yarn from bath 6 is dyed a very pale yellow. Measurements of color depth show that the dye in bath 6 was at least 90% hydrolyzed (destroyed) by the two hours heating at reflux.

Other products of this invention are prepared by suitable substitution of known compounds in the procedure of Example I. For example, when the aromatic amines and organosulfinate salts indicated in Table I are employed respectively in place of N,N-dimethylaniline and sodium p-toluenesulfinate in the reaction with dichlorofumaronitrile in Part A of Example I and the resulting 1,2-dicyano-2-sulfonylvinyl dyes (compounds of Formula I) are substituted for 2-(4-N,N-dimethylaminophenyl)-1-(4-tolylsulfonyl)ethene-1,2-dicarbonitrile in the reaction with hydrogen in the presence of palladium-on-carbon catalyst as shown in Part B of Example I, the indicated 1,2-dicyanovinyl-substituted aromatic amine dyes (compounds of Formula III) are obtained.

and 4-haloaryl, wherein the aryl in said aryl and substituted aryls contains 6 to 18 carbon atoms and is selected from the group consisting of phenyl, naphthyl, anthryl and lower alkyl substituted phenyl, naphthyl and anthryl.

2. Compounds of the formula

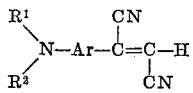

wherein Ar is 1,4-phenylene and $R^1$ and $R^2$ each represents lower alkyl.

TABLE I

| Aromatic amine $R^1\!\!\diagdown\!\!N\text{—Ar—H}/R^2$ | Organosulfinic acid $R^3SO_2H$ (Used as sodium salt) | 1,2-dicyanovinylaromatic amine product $R^1\!\!\diagdown\!\!N\text{—Ar—}\overset{CN}{\underset{CN}{C}}\!=\!C\text{—H}/R^2$ |
|---|---|---|
| N,N-diethyl-α-naphthylamine | β-Naphthylsulfinic acid | 4-(1,2-dicyanovinyl)-N,N-diethyl-1-naphthylamine. |
| N-(β-benzoxyethyl)-N-ethylaniline | p-Bromophenylsulfinic acid | N-(β-benzoxyethyl)-4-(1,2-dicyanovinyl)-N-ethylaniline. |
| 2,6-dimethylaniline | p-Fluorophenylsulfinic acid | 4-(1,2-dicyanovinyl)-2,6-dimethylaniline. |
| β-(N-ethylanilino)ethyltrimethyl-ammonium chloride. | p-Iodophenylsulfinic acid | β-[N-ethyl-N-(p-[1,2-dicyanovinyl]phenyl)amino]ethyltrimethyl-ammonium chloride. |
| N-cyclohexyl-N-methylaniline | Octadecylsulfinic acid | N-cyclohexyl-4-(1,2-dicyanovinyl)-N-methylaniline. |
| N,N-bis(2-ethoxyethyl)aniline | β-Chloroethylsulfinic acid | N,N-bis(2-ethoxyethyl)-4-(1,2-dicyanovinyl)aniline. |
| N,N-dimethyl-1-anthrylamine | β-Cyanoethylsulfinic acid | 4-(1,2-dicyanovinyl)-N,N-dimethyl-1-anthrylamine. |
| N,N-dimethyl-9-anthrylamine | β-Methoxyethylsulfinic acid | 10-(1,2-dicyanovinyl)-N,N-dimethyl-9-anthrylamine. |
| N,N-bis(β-hydroxyethyl)aniline | β-Hydroxyethylsulfinic acid | N,N-bis(β-hydroxyethyl)-4-(1,2-dicyanovinyl)aniline. |
| N,N-bis(β-bromoethyl)aniline | Methylsulfinic acid | N,N-bis(β-bromoethyl)-4-(1,2-dicyanovinyl)aniline. |
| N,N-bis(β-chloroethyl)aniline | n-Butylsulfinic acid | N,N-bis(β-chloroethyl)-4-(1,2-dicyanovinyl)aniline. |
| N,N-bis(β-iodoethyl)aniline | Benxylsulfinic acid | N,N-bis(β-iodoethyl)-4-(1,2-dicyanovinyl)aniline. |
| N,N-bis(β-fluoroethyl)aniline | Phenylsulfinic acid | N,N-bis(β-fluoroethyl)-4-(1,2-dicyanovinyl)aniline. |
| N-methylaniline | Ethylsulfinic acid | 4-(1,2-dicyanovinyl)-N-methylaniline. |
| N-(β-cyanoethyl)-N-methylaniline | p-Chlorophenylsulfinic acid | N-(β-cyanoethyl)-4-(1,2-dicyanovinyl)-N-methylaniline. |
| Triphenylamine | p-Cyanophenylsulfinic acid | 4-(1,2-dicyanovinyl)-N,N-diphenylaniline. |
| 4-methoxydiphenylamine | p-Methoxyphenylsulfinic acid | 4-(1,2-dicyanovinyl)-N-(4-methoxyphenyl)aniline. |
| 4-chlorodiphenylamine | p-Isopropylphenylsulfinic acid | N-(4-chlorophenyl)-4-(1,2-dicyanovinyl)aniline. |
| 4-anilinophenol | p-Hydroxyphenylsulfinic acid | 4-(1,2-dicyanovinyl)-N-(4-hydroxyphenyl)aniline. |
| 4-cyanodiphenylamine | 2-Anthrylsulfinic acid | N-(4-cyanophenyl)-4-(1,2-dicyanovinyl)aniline. |
| N,N-diethylaniline | β-Benzyloxyethylsulfinic acid | 4-(1,2-dicyanovinyl)-N,N-diethylaniline. |
| N,N-dioctadecylaniline | p-Benzyloxyphenylsulfinic acid | 4-(1,2-dicyanovinyl)-N,N-dioctadecylaniline. |
| N-(β-acetoxyethyl)-N-methylaniline | p-Methoxycarbonylphenyl-sulfinic acid. | N-(β-acetoxyethyl)-4-(1,2-dicyanovinyl)-N-methylaniline. |
| N-(δ-ethoxycarbonylvaleroxyethyl)-N-methylaniline. | Ethoxycarbonylmethylsulfinic acid | 4-(1,2-dicyanovinyl)-N-(δ-ethoxycarbonylvaleroxyethyl)-N-methylaniline. |
| N-(β-diethylacetoxyethyl)-N-methylaniline. | β-Phenoxyethylsulfinic acid | 4-(1,2-dicyanovinyl)-N-(β-diethylacetoxyethyl)-N-methylaniline. |
| N-(p-toluoxyethyl)-N-methyl aniline | 4-bromo-3-formylphenylsulfinic acid | 4-(1,2-dicyanovinyl)-N-methyl-N-(p-toluoxyethyl)aniline. |
| N-(m-chlorobenzoxyethyl)-N-methylaniline. | 4-chloro-2-nitrophenylsulfinic acid | N-(m-chlorobenzoxyethyl)-4-(1,2-dicyanovinyl)-N-methylaniline. |

As many widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Compounds of the formula

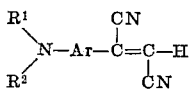

wherein Ar is selected from the group consisting of phenylene, naphthylene and anthrylene and wherein $R^1$ and $R^2$ each is selected from the group consisting of hydrogen, alkyl of up to 19 carbon atoms, haloalkyl of up to 19 carbon atoms, β-hydroxyethyl, β-alkoxyethyl, β-carbacyloxyethyl, β-cyanoethyl, β-trialkylammoniumethyl chloride, aryl, 4-hydroxyaryl, 4-alkoxyaryl, 4-cyanoaryl 3. Compounds of the formula

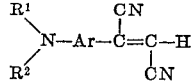

wherein Ar is 1,4-phenylene, $R^1$ represents β-carbacyloxyethyl and $R^2$ represents lower alkyl.

4. p-(1,2-dicyanovinyl)-N, N-dimethylaniline.

5. p-(1,2-dicyanovinyl) - N - benzoxyethyl-N-methylaniline.

References Cited by the Examiner

UNITED STATES PATENTS 2,889,335  6/1959  Heckert _____ 260—465

OTHER REFERENCES

Bateman et al.: Chemical Society Journal (London), 1958, Part 3, pages 2888–2890.

Walter: Deutsche Chemische Gesellschaft Berichte, 1902, volume 35, page 1320.

CHARLES B. PARKER, *Primary Examiner.*